9747X
T. C. Harrison,
Lancet.
Patented June 20, 1836.
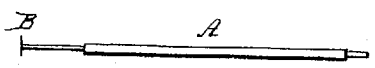
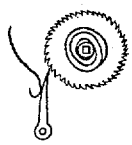
AM. PHOTO-LITHO. CO. N.Y. (OSBORNE'S PROCESS.)

Thomas C. Harrison

The Schedule referred to in these Letters Patent and making part of the
same containing a description in the words of the said Tho C. Harrison
himself of his improvement in the Revolving Lancet.

Be it known that I Thomas C. Harrison of New Egypt,
county of Monmouth, and State of New Jersey, have made an im-
provement in the useful art being a revolving surgical instrument
for performing incisions in surgical operations, called "Harrison's revol-
-ving Lancet" which is described as follows, reference being had to
the annexed drawings of the same, making part of this specification.

This Instrument consists of a small revolving cylindrical
axle A having a circular steel cutter B about an eighth of an inch
or more in diameter, fastened on one end of it, and at the other end is
attached a spring C similar to the main spring of a Watch, which is
wound up in a barrel in the manner of a time piece by a key ap-
plied to the end of the axle which is made square and secured by
ratchet wheel & click. When an incision is to be made for bleeding
removing a tumor, or for any other purpose, the operator winds up
the instrument lays bare the place to receive the incision - takes
the instrument between his thumb & forefingers - sets it in motion by
pressing upon the end of a lever which raises the click from the ratchet
wheel and suffers the spring to act which turns the axle with the
cutter. He then applies the cutter to the spot to receive the in-
cision and bears lightly upon it till the cut is made of the depth
required, the instrument is then removed. This instrument may be
regulated to the utmost nicety so as to make an incision of any length
or depth required by a steady hand. The cutter may be made cir-
-cular or of any other figure required and may be turned in the manner
before described or in any other mode preferred. What I claim as
my invention and which I desire to secure by Letters Patent,
consists in the method of performing incisions in surgical operations for
bleeding and for other purposes by means of a revolving cutter.

William P. Elliot }
Clement T. Coote } Witnesses

Thomas C. Harrison 429 no 99 [illegible]

[illegible]